United States Patent [19]

Joseph

[11] 4,248,441
[45] Feb. 3, 1981

[54] CONTROL HANDLEBAR FOR TRANSPORT OR HANDLING CARTS

[75] Inventor: Raymond Joseph, Schiltigheim, France

[73] Assignee: Ateliers Reunis S.A., Schiltigheim, France

[21] Appl. No.: 10,704

[22] Filed: Feb. 8, 1979

[30] Foreign Application Priority Data

Feb. 16, 1978 [FR] France ............................. 78 04418

[51] Int. Cl.³ .............................................. B62B 5/06
[52] U.S. Cl. ............................ 280/33.99 A; 16/111 R; 16/DIG. 24; 280/47.34
[58] Field of Search ................ 280/33.99 R, 33.99 A, 280/33.99 F, 33.99 S, 33.99 H, 79.1, 79.3, 47.37 R, 47.34; 280/47.34, 16/111 R, DIG. 24, DIG. 41, DIG. 18, DIG. 40; 24/213 B, 214, 208 A

[56] References Cited

U.S. PATENT DOCUMENTS

| 1,742,914 | 1/1930 | Holden | 16/DIG. 18 |
| 2,112,247 | 3/1938 | McLoughlin | 24/214 |
| 2,731,662 | 1/1956 | Mills | 16/111 R |
| 4,123,077 | 10/1978 | Joseph | 280/33.99 R |

FOREIGN PATENT DOCUMENTS 1383543  2/1975  United Kingdom ............ 280/33.99 A Primary Examiner—David M. Mitchell
Attorney, Agent, or Firm—Michael J. Striker

[57] ABSTRACT

A device for assembling the upper ends of the lateral uprights of a transport or handling cart with the transverse tubular grip handle, which compvises a sheath fitting on the bent upper end of each upright and a lock key adapted to be inserted into the sheath cavity so as to interlock the sheath and the upright end. Each sheath has formed on its inner side a projecting stud engageable into the corresponding end of the tubular grip handle. A cam projecting from one or both sides of the lock key engages a registering aperture formed in the sheath walls, one of these members, key or sheath, having a certain elasticity to permit the insertion of the key into the sheath.

8 Claims, 11 Drawing Figures

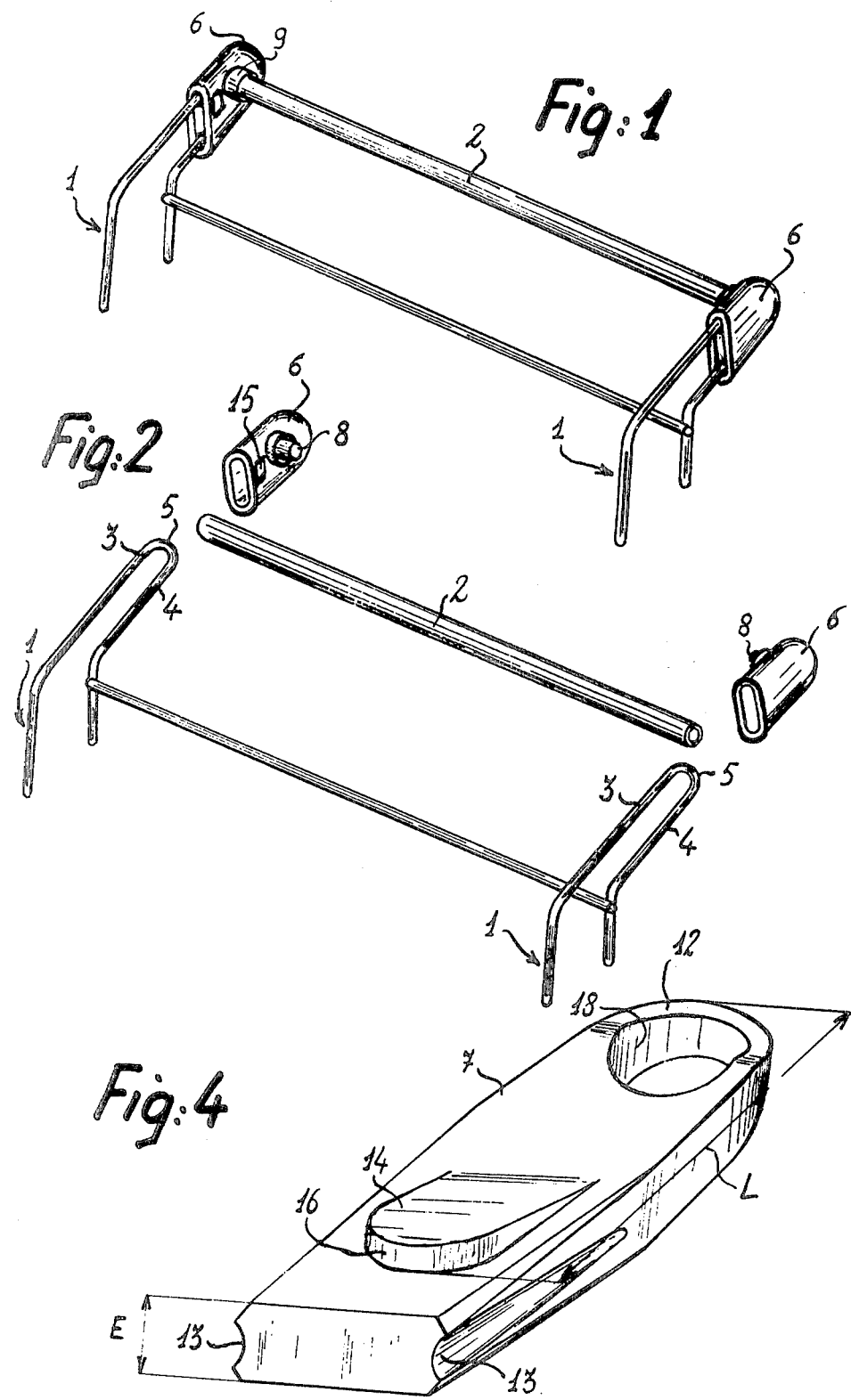

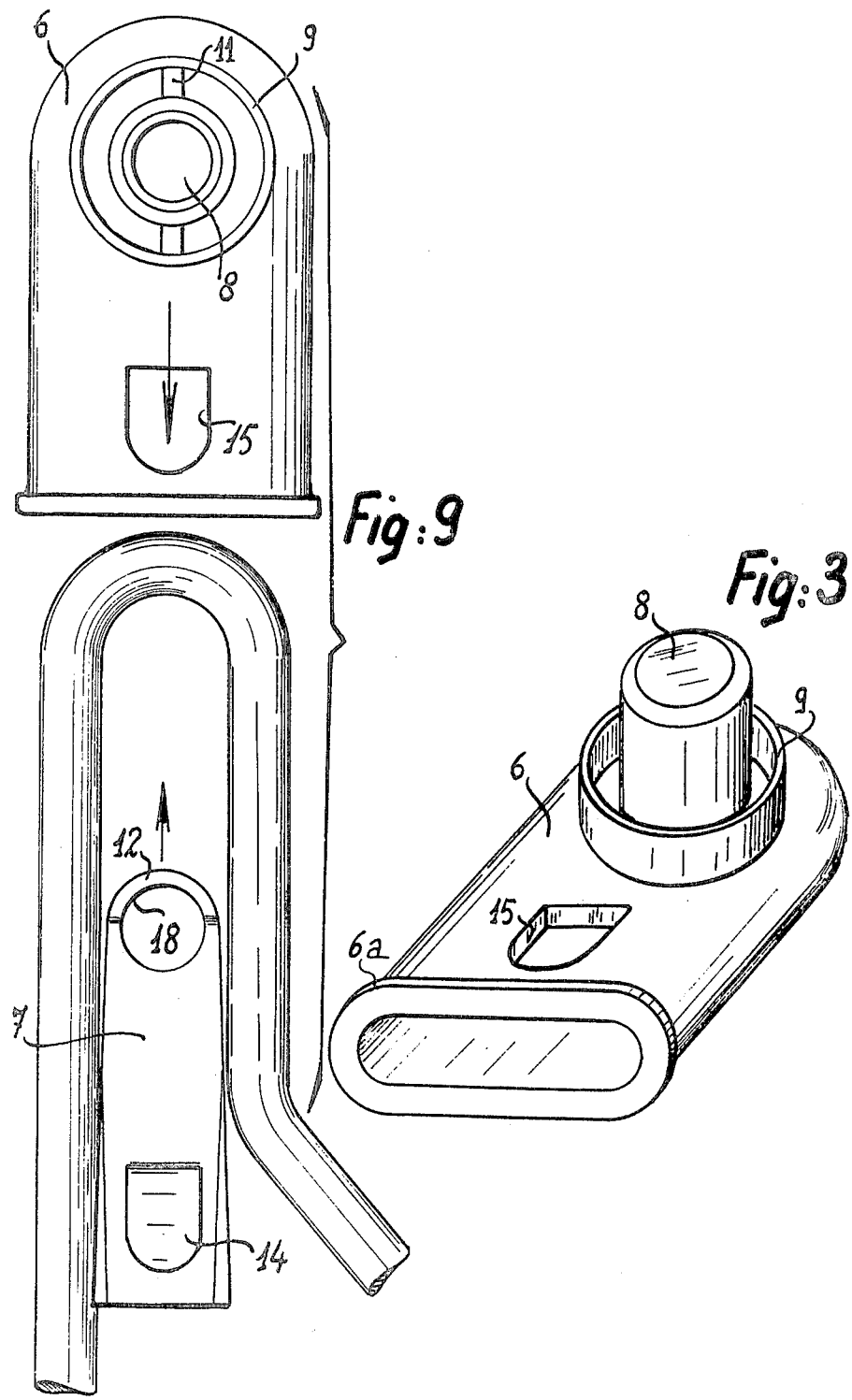

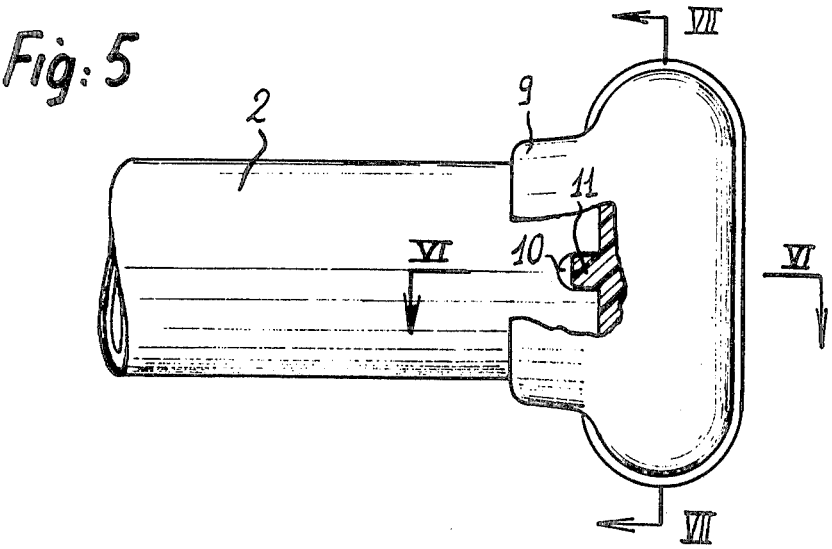
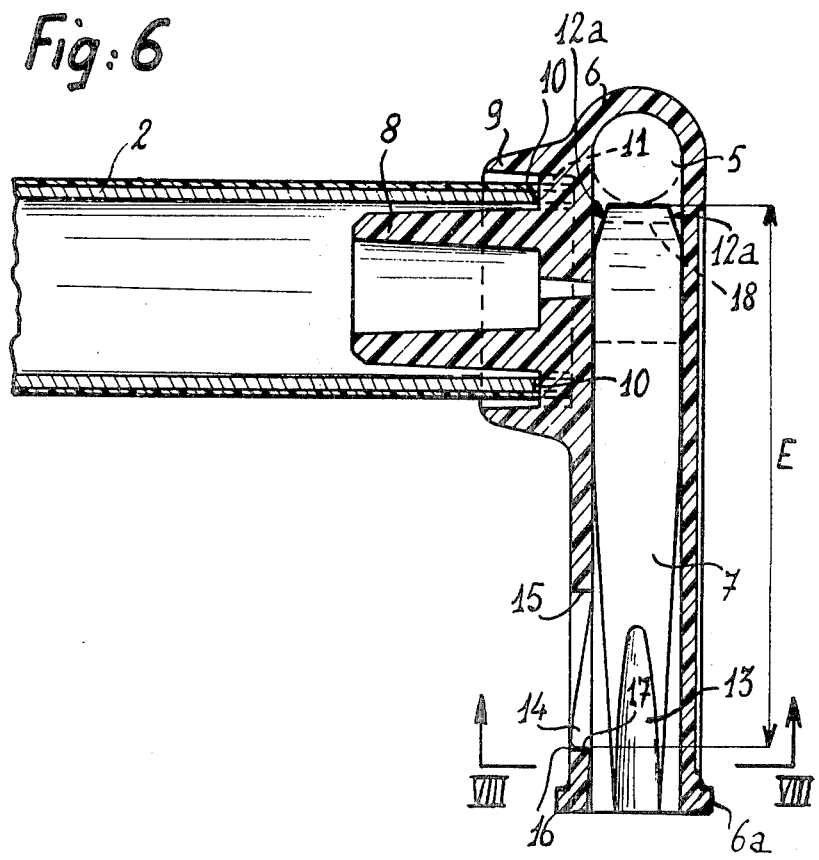

CONTROL HANDLEBAR FOR TRANSPORT OR HANDLING CARTS

BACKGROUND OF THE INVENTION

1. Field of the Invention

The present invention relates in general to transport or handling carts, and more particularly to the handlebars for controlling and manoeuvering carts of this character, of the type wherein each upright comprises a metal wire or tube bent on itself at its upper end, the grip handle consisting of a transverse tube secured at either end to the top ends or elbows of said upright.

Control handlebars of this type are provided more particularly on transport carts put at the disposal of customers in selfservice shops and the like, such as supermarkets, and also in workshops. However, many other kinds of transport or handling carts are also provided with control handlebars of the same type.

2. Description of the Prior Art

At present, the ends of the transverse tube acting as a grip handle are secured in general to the upper ends of the uprightforming bent metal wire or tube by means of assembling devices comprising screw-or bolt-type clamping or locking means. Thus, the French Patent Application No. 70 24007 published under the No. 2,109,046 to the Applicant is directed to an assembling device intended for this purpose and consisting essentially of a pair of shells adapted to enclose between them the relevant upper portion of one of the cart handlebar uprights, one of these shells being formed with an integral stud adapted to engage the registering end of the grip-handle forming tube. These two members are subsequently tightly assembled by means of a screw or bolt engaging with its end the stud on which the tube end is fitted. The arrangement is such that when this screw or bolt is tightened the two shells are assembled with each other and the stud is wedged within the handlebar forming tube.

However, in operation it was found that this wedging action was unnecessary for it is sufficient to keep the horizontal tube in position between the two substantially vertical uprights. Besides, the assembling and fastening operations are relatively long and tedious and must be carried out by taking care not to tighten the screws or bolts excessively since an untimely distortion of the shells would occur. On the other hand, assembling means of this character are relatively expensive due to the number of component elements involved. Finally, considering the differences normally existing between the curvatures of the upper ends of the metal wire uprights, it is a frequent occurence that the shells cannot fit exactly on the upright ends.

SUMMARY OF THE INVENTION

In view of the foregoing, it is the primary object of the present invention to provide a cart control handlebar of the type broadly set forth hereinabove wherein the upper transverse tubular grip handle is assembled with the lateral uprights by means of simpler and more economical means in comparison with hitherto known devices proposed for the same purpose. It is another object of this invention to overcome the various inconveniences of these prior art devices and also to eliminate any screw or bolt fastening or clamping means.

To this end, the cart control handlebar according to this invention is characterized in that its component elements are assembled, at either ends of the top tubular grip handle, by means of a sheath-like member fitted to the upper end of the corresponding upright and locked in position by a key inserted into this sheath between the two arms of the upright end or elbow, this key being provided with a projection adapted to act as a lock cam engageable into an aperture formed in the sheath, the latter carrying an external projecting stud adapted to engage and retain the corresponding tubular end of the grip handle.

With this particular arrangement of the assemblying devices the upper ends of the uprights and the tubular handlebar can be assembled very easily and rapidly, without using any screw or nut. The key for locking each sheath in position is introduced by force fitting and momentary elastic deformation of the relevant sheath, the latter being manufactured by moulding from a suitable plastics material. However, it is also possible to use a sheath-shaped rigid element but in this case the lock key should be made from a material and with a design such that it can be compressed momentarily on itself when fitted to the elbow of the upper upright end.

The various features and advantages of the control handlebar according to this invention and of the assemblying means associated therewith will appear as the following description proceeds with reference to the accompanying drawings illustrating diagrammatically various forms of embodiment of the invention which are given by way of illustration, not of limitation.

BRIEF DESCRIPTION OF THE DRAWINGS

FIGS. 1 and 2 are perspective views showing the upper portion of a control handlebar assembly according to the instant invention, before and after the assembling of its component elements, respectively;

FIGS. 3 and 4 are perspective views taken at different scales showing the sheath member and the lock key of an assembling device, respectively;

FIG. 5 is an end view with parts broken away showing one of the assemblying devices;

FIGS. 6 and 7 are sections taken along the lines VI—VI and VII—VII of FIG. 5;

FIG. 9 is a diagrammatic side elevational view illustrating the manner in which the assembling device is used.

DESCRIPTION OF THE PREFERRED EMBODIMENTS

Figure 7:
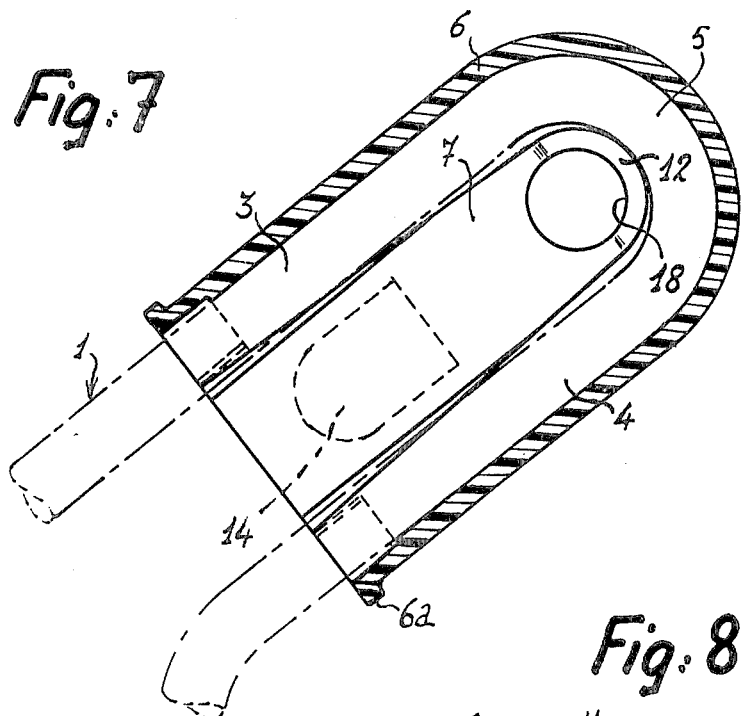

Referring first to FIG. 1, the control handlebar for transport or handling carts according to this invention comprises a pair of substantially vertical lateral uprights 1 and a transverse grip handle 2. As customary in most transport carts put at the disposal of customers in supermarkets and similar selfservice shops, each lateral upright consists of a metal wire of adequate gauge bent on itself at its upper end. At this upper end the corresponding wire forms a hairpin bend of which the two somewhat spaced arms 3 and 4 are parallel to each other so as to form a rounded end elbow 5. The grip handle 2 consists simply of a substantially horizontal tube section having its ends secured to the upper ends of the uprights 1.

The ends of the tubular handlebar 2 are secured to the relevant upright ends by means of a sheath 6 with the assistance of a lock key 7. The sheath 6 consists of an oval-sectioned tubular body open at one end and closed at the other rounded end, this tubular body being adapted to fit on the upper end of the upright 1 so as to clamp somewhat the two parallel arms 3 and 4 thereof. The sheath 6 is manufactured by moulding from a suitable plastics material of such composition and thickness that its walls can undergo simultaneously a momentary elastic distortion to permit the insertion of the lock key 7 into its open end, as will be explained presently. However, this open end of each sheath 6 comprises a reinforcing bead 6a moulded integrally therewith.

Projecting from one of the side faces of each sheath 6 is a projecting stud 8 adapted to be engaged into the relevant hollow end of the grip-handle forming tube 2. Preferably and advantageously, this stud 8 is surrounded by an external neck adapted to fit on the tube end.

To preclude any tendency of the tube 2 from rotating about its axis, its ends are formed with a pair of diametrically opposed notches 10 each engaged by a lug 11 registering therewith and formed in the bottom of the annular gap left between the stud 8 and the collar 9 of the corresponding sheath 6 (see FIGS. 5 and 6).

Figure 8:
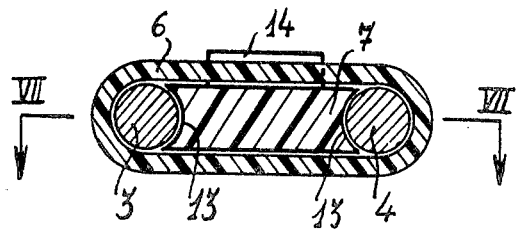
FIG. 8 is a section taken along the line VIII—VIII of FIG. 6.

The lock key 7 associated with each assembling device has substantially the shape of a solid or hollow elongated plate adapted to be inserted into the cavity of the corresponding sheath 6 between the two arms 3 and 4 of the bent upper end of the relevant upright 1. For this purpose, the inner end 12 of this lock key 7 is rounded in order to correspond in shape to the end loop or elbow 5 of this upright. On the other hand, the same end of lock key 7 comprises a section 12a having a certain taper or cant for facilitating its introduction into the sheath 6 between the two arms 3 and 4. Also in order to facilitate this insertion the lateral faces of lock key 7 have a slight taper. Moreover, adjacent the end opposing its rounded end each key 7 has formed in its lateral faces grooves 13 of a depth decreasing from this end inwards so as to accommodate the rounded contour of the corresponding portions of arms 3 and 4, as clearly shown in FIG. 8.

Each lock key 7 comprises on one of its faces a projection 14 adapted to act as a lock cam by engaging from inwards out an aperture 15 formed in the registering wall of the surrounding sheath 6. On the side directed towards the rounded end 12 this projection 14 has a ramp-forming inclined face adapted to facilitate the introduction of the key 7 into the sheath 6 by virtue of a momentary elastic distortion of this sheath. However, on the opposite side this projection terminates with a rounded face 16 substantially perpendicular to the corresponding side face of the key proper. The function of this perpendicular face 16 is to engage and bear against the corresponding face or contour 17 of the aperture 15 of sheath 6, when the lock key 7 has been fitted home into the sheath 6 (see FIG. 6). In fact, it is this contact between the two arcuate faces 16 and 17 that causes the two members 6 and 7 to be fastened to each other and, consequently, that safely fits the sheath 6 on the corresponding end of upright 1, since the loop formed by this upright end is retained between the sheath 6 and key 7.

In order to obtain a playless, reliable locking action, the distance L between the bearing face 16 of lock cam 14 and the rounded end of key 7 is somewhat greater than the distance E between the bearing face 17 of aperture 15 and the inside of the elbow 5 formed in the metal wire 1 when the sheath 6 is fitted thereon. Under these conditions, the lock cam 14 cannot properly fit into the aperture 15 and the bearing surfaces 16 and 17 thereof cannot engage each other adequately unless the key 7 is subjected to a certain elastic contraction in the longitudinal direction thereof.

To this end, a hole 18 of sufficient diameter is formed through the rounded end 12 of key 7 (see FIG. 4). The presence of this hole 18 actually permits a certain elastic contraction of the corresponding key end, so that the lock cam 14 can penetrate into the aperture 15. However, at the same time any longitudinal play is eliminated, so that a particularly efficient and reliable locking action is obtained.

By virtue of the particular design provided by the present invention for this assembling device at each end of the tubular grip handle 2, the latter can be fastened to the two uprights 1 of the side members of a cart frame very easily and rapidly without having to use any screw or nut. In fact, for each end of this tube it is only necessary to fit the sheath 6 of a corresponding assembling device to the upper end of the corresponding upright and to lock this sheath in position by means of the lock key 7. Now, this operation is accomplished very simply by force fitting this key into the sheath 6 between the two arms 3 and 4 of the upper end portion of upright 1, until the lock cam 14 engages the registering aperture 15. Likewise, the corresponding end of tube 2 is secured very easily since it is only necessary to fit this end around the stud 8 projecting laterally inwards from the corresponding sheath 6 while taking care that the lugs 11 engage the notches 10.

The fastening of the sheath 6 with the lock key 7 may be further reinforced by forming on the lock key 7 a pair of lock cams 14 each projecting from one of the major faces of the cam. In this case, it is necessary of course to form a corresponding aperture 15 through each lateral face of sheath 6.

Figure 10:
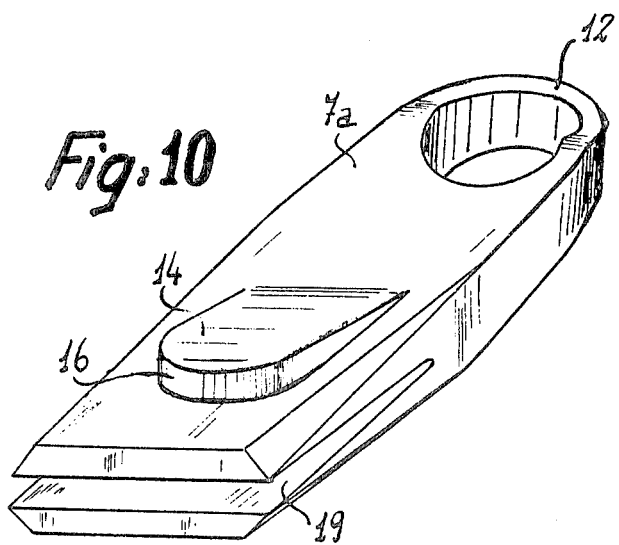

In the above-described form of embodiment, the possibility of force-fitting the lock key 7 results from the momentary elastic distortion of the walls of the corresponding sheath 6. However, it would also be possible to contemplate the inverse solution, i.e. the elastic contraction of the key across its thickness in order to permit its introduction into the sheath 6. Besides, FIG. 10 illustrates a key 7a designed for this purpose. At its end opposing its rounded end 12 this key comprises a slot 19 extending inwards between the major faces of the key, the width of this slot decreasing in this direction. Thus, the provision of this slot permits a momentary elastic contraction of the lock key 7a so as to reduce momentarily its thickness to permit the passage of the lock cam or cams 14 until the latter register with the lateral aperture or apertures 15 of the relevant sheath 6, so that the key can resume its normal thickness as a consequence of the penetration of said lock cam or cams into said aperture or apertures.

Figure 11:
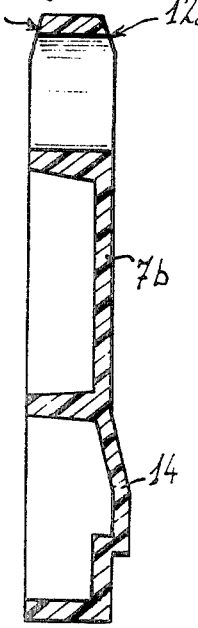
FIGS. 10 and 11 are a perspective view and a longitudinal section respectively showing two other modified forms of embodiment of the lock key incorporated in the assembling devices.

FIG. 11 illustrates a further possible of embodiment of the lock key. In this modified version the lock key 7b is hollow but comprises as in the preceding forms of embodiment a lock cam 14 on or least one of its major faces.

However, many changes and modifications may be brought to the control handlebar according to this invention and the assembling means provided therein as illustrated and described herein, without departing from the basic principles of the invention.

As already mentioned in the foregoing, this control handlebar is intended notably for transport or handling carts of the type usually put at the disposal of customers in self-service shops and supermarkets. However, this handlebar may also be fitted to many other types of carts, hand-carts and like vehicles intended for transport and/or handling purposes.

What is claimed as new is:

1. In a transport or material-handling cart, notably of the type put at the disposal of customers in supermarkets and other self-service shops, a control handlebar of the type comprising essentially on the one hand a pair of lateral uprights consisting each of a metal wire or tube bent on itself at its upper end and on the other hand of a grip-handle forming straight tube, and a device for assembling each upright to one end of the tubular grip handle, wherein each assembling device comprises on the one hand a sheath open at one end and closed at the other end, so that the bent end of the revelant upright can be introduced into the sheath, and on the other hand a key for locking said sheath in position by inserting said key into the sheath cavity between the two arms of the bent upright ends, said lock key being provided on at least one of its major faces with a projection adapted to act as a lock cam by engaging a registering aperture formed in the wall of the corresponding sheath, said sheath further comprising a stud projecting from its inner face and adapted to be inserted into the corresponding end of the tubular grip handle.

2. A control handlebar as claimed in claim 1, wherein the sheath of each assembling device consists of a resiliently deformable material whereby its walls can undergo a momentary distortion to permit the insertion of said lock key.

3. A control handlebar as claimed in claim 1, wherein said sheath consists of a relatively rigid material and said key is made of a resiliently deformable material and has formed intermediate its major faces a slot permitting a momentary elastic contraction of the key across its thickness so that the key can be introduced into the cavity of the relevant sheath.

4. A control handlebar as claimed in claim 1, wherein said lock-cam forming projection of each key comprises a face inclined towards its inner end and adapted to act as a ramp to facilitate the insertion of the key into the sheath cavity and at its opposite end a face extending at right angles to the corresponding lateral or major face of the key for engagement with a registering face of the aperture formed in said sheath.

5. A control handlebar as claimed in claim 4, wherein the distance between the inner end of the lock key and the bearing face of said lock cam is greater than the distance between said registering face of the aperture formed in said sheath and the inside of the loop formed at the bent end of the relevant upright when said sheath is in its operative position.

6. A control handlebar as claimed in claim 5, wherein a hole of a diameter sufficient to allow a longitudinal contraction of the inner end of each lock key is formed through said inner end.

7. A control handlebar as claimed in claim 6, wherein the lateral faces of each lock key are slightly inclined to facilitate he insertion of the key and grooves are formed on the same faces along their portions adjacent the outer end of the key.

8. A control handlebar as claimed in claim 7, wherein the stud projecting from the sheath of each assembling device is surrounded by a projecting collar, and one or a plurality of lugs being also provided in the corresponding wall of said sheath and adapted to engage matching notches formed in the relevant end of said tubular grip handle for preventing said grip handle from rotating about its axis.

* * * * *